(12) United States Patent
Yang et al.

(10) Patent No.: US 8,421,877 B2
(45) Date of Patent: Apr. 16, 2013

(54) FEATURE DATA COMPRESSION DEVICE, MULTI-DIRECTIONAL FACE DETECTION SYSTEM AND DETECTION METHOD THEREOF

(75) Inventors: Tai-Chang Yang, Kaohsiung (TW); Hong-Long Chou, Taipei (TW); Wen-Yan Chang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 66 days.

(21) Appl. No.: 13/284,504

(22) Filed: Oct. 28, 2011

(65) Prior Publication Data

US 2013/0070115 A1 Mar. 21, 2013

(30) Foreign Application Priority Data

Sep. 20, 2011 (TW) .............................. 100133750 A

(51) Int. Cl.
*H04N 5/228* (2006.01)
*G06K 9/00* (2006.01)
(52) U.S. Cl.
USPC .... 348/222.1; 382/118; 382/243; 348/207.99
(58) Field of Classification Search ................ 348/222.1; 382/118
See application file for complete search history.

(56) References Cited

U.S. PATENT DOCUMENTS

| 5,835,616 | A * | 11/1998 | Lobo et al. | 382/118 |
| 6,885,761 | B2 * | 4/2005 | Kage | 382/118 |
| 7,620,217 | B2 * | 11/2009 | Chen et al. | 382/118 |
| 7,860,280 | B2 * | 12/2010 | Danowitz | 382/118 |
| 8,073,287 | B1 * | 12/2011 | Wechsler et al. | 382/278 |
| 8,165,352 | B1 * | 4/2012 | Mohanty et al. | 382/115 |
| 2006/0274956 | A1 * | 12/2006 | Sohn et al. | 382/238 |
| 2012/0288167 | A1 * | 11/2012 | Sun et al. | 382/118 |

* cited by examiner

*Primary Examiner* — Ngoc-Yen Vu
(74) *Attorney, Agent, or Firm* — Wang Law Firm, Inc.; Li K. Wang; Stephen Hsu

(57) ABSTRACT

A feature data compression device, a multi-directional face detection system and a detection method thereof. The feature data compression device comprises a mirror unit and a transposition unit. The mirror unit compares and computes a plurality of feature values each other to obtain a position of each mutual symmetric feature value and abandoning one of each two symmetric feature values to form first mirrored data, or to obtain a position of the feature value with the highest weight value to form second mirrored data. The transposition unit transposes at least one image template with an angle based on a transposition table for obtaining transposed data.

12 Claims, 7 Drawing Sheets

FEATURE DATA COMPRESSION DEVICE, MULTI-DIRECTIONAL FACE DETECTION SYSTEM AND DETECTION METHOD THEREOF

CROSS-REFERENCE TO RELATED APPLICATION

This application claims the benefit of Taiwan Patent Application No. 100133750, filed on Sep. 20, 2011, in the Taiwan Intellectual Property Office, the disclosure of which is incorporated herein in its entirety by reference.

BACKGROUND OF THE INVENTION

1. Field of the Invention

The present invention relates to a face feature data compression device, in particular to the feature data compression device capable of compressing data by using the mirrorability and the transposability of the face feature data, and a multi-directional face detection system and a multi-directional face detection method applying the feature data compression device.

2. Description of the Related Art

In a conventional face detection method, testing pictures are inputted into a learning model, and the learning model will learn how to determine whether the testing pictures include any predetermined template feature. Regardless of an active learning structure such as a neural network, an expert system, a fuzzy system or a classified learning structure such as a support vector machine (SVM), a principal components analysis (PCA), a snow method or a boosting method, the learning can be achieved by a plurality of set template features.

To differentiate a face from a background in the testing pictures, a Haar-like algorithm is generally used for capturing the face features, wherein the Haar-like algorithm is an algorithm for processing the features based on a texture direction of patterns. Therefore, the Haar-like algorithm can differentiate a face from a complicated background effectively. Since the Haar-like algorithm relies on the texture direction of the testing pictures, therefore when the testing pictures are transposed to a different direction such as transposing the testing pictures with 90 degrees, 180 degrees or 270 degrees, the texture direction of the face in the testing picture will be different, so that the template feature computed by the original Haar-like algorithm cannot be used for the transposed testing pictures.

To detect the face of the testing pictures transposed to a different position, it is necessary to use the Haar-like algorithm to perform a learning training of the face features of the testing pictures at different transposed positions to generate corresponding template features of the different transposed positions. Obviously, the aforementioned method not only wastes a large quantity of memory spaces, but also wastes several times of the computing time.

However, a present mobile device such as a camera, a mobile phone or a camcorder generally comes with a light, thin, short and compact design for convenient carry, therefore the mobile device usually provides limited memory spaces. To reduce the data volume of the template features, the angle of the face detection is reduced. For example, a planar rotation angle or a side face angle is used for the detection or a lower precision of the template features is adopted. However, these methods generally result in a low face detection performance due to the factors of limited angle, low brightness or dark skin color.

SUMMARY OF THE INVENTION

In view of the drawbacks of the prior art, it is a primary objective of the present invention to provide a feature data compression device, a multi-directional face detection system and a method using the feature data compression device to overcome the problems of consuming too much computing time and memory spaces for the detection of the faces transposed to different positions.

To achieve the aforementioned objective, the present invention provides a feature data compression device, comprising a converting unit, a mirror unit and a transposition unit. The converting unit converts a face image to obtain a plurality of feature values of the face image to form at least one image template according to the feature values and each feature value includes a weight value. The mirror unit is coupled to the converting unit for comparing and computing the feature values each other to obtain a position of each mutual symmetric feature value and abandoning one of each two symmetric mutual feature values to form the first mirrored data, or comparing and computing the feature values each other to obtain a position of the feature value with the highest weight value to form the second mirrored data. The transposition unit is coupled to the converting unit for transposing the at least one image template with an angle according to a transposition table, and computing the transposed image template to obtain a plurality of transposed feature values for forming a transposed data.

To achieve the aforementioned objective, the present invention further provides a multi-directional face detection system applied to the feature data compression device, and the multi-directional face detection system includes an image capture device, a feature data compression device and a face detection device as described above. The image capture device captures a face image, and the feature data compression device is coupled to the image capture device for receiving a face image. The face detection device is coupled to the image capture device and the feature data compression device, and the face detection device performs a front face detection, a side face detection, a transposed front face detection or a transposed side face detection according to the first mirrored data, the second mirrored data or the transposed data.

Wherein, the first mirrored data is used to form a front face template and the face detection device performs a front face detection according to the front face template; the second mirrored data is used to form a side face template and the face detection device performs a side face detection according to the side face template, and the transposed data form a transposed front face template or a transpose side face template and the face detection device performs a transposed front face detection or the transposed side face detection according to the transposed front face template or the transpose side face template.

To achieve the aforementioned objective, the present invention further provides a feature data compression device, comprising: converting means for computing a face image to obtain a plurality of feature values of the face image to form at least one image template and each feature value including a weight value; a mirror means for comparing and computing each feature value each other to obtain a position of each mutual symmetric feature value and abandoning one of each two mutual symmetric feature values to form the first mirrored data, or comparing and computing each feature value each other to obtain a position of the feature value with the highest weight value to form the second mirrored data, and transposition means, for transposing the at least one image template with an angle according to a transposition table and computing the transposed image template to obtain a plurality of transposed feature values for forming a transposed data.

In addition, the present invention further provides a detection method applicable in a multi-directional face detection system. The multi-directional face detection system comprises an image capture device, a converting unit, a mirror unit, a transposition unit and a face detection device. The face detection method comprises the steps of: capturing a face image by the image capture device; converting the face image by the converting unit to obtain a plurality of feature values of the face image; forming at least one image template according to the feature values and each feature value including a weight value; comparing and computing each feature value by the mirror unit; obtaining a position of each mutual symmetric feature value and abandoning one of each two mutual symmetric feature values to form the first mirrored data, or comparing and computing each feature value to obtain a position of the feature value with the highest weight value to form the second mirrored data; transposing the at least one image template with an angle according to a transposition table by the transposition unit and computing the transposed image template to obtain a plurality of transposed feature values for forming a transposed data, and performing a front face detection, a side face detection, a transposed front face detection or a transposed side face detection by the face detection device according to the first mirrored data, the second mirrored data or the transposed data.

The detection method further comprises the steps of forming a front face template by the first mirrored data; and performing the front face detection by the face detection device according to the front face template.

The detection method further comprises the steps of forming a side face template by the second mirrored data; and performing the side face detection by the face detection device according to the side face template.

The detection method further comprises the steps of forming a transposed front face template or a transposed side face template by the transposed data; and performing the transposed front face detection or the transposed side face detection by the face detection device according to the transposed front face template or the transposed side face template.

In summation, the feature data compression device, and the multi-directional face detection system and method applying the feature data compression device in accordance with the present invention have one or more of the following advantages:

(1) The feature data compression device can simplify the original feature data to reduce the data volume of the feature data and the consumption of the memory spaces by means of the mirrorability of the face feature.

(2) The feature data compression device can transpose the original feature with a required angle by means of the transposability of the face feature to solve the problem of requiring sampling the features of the transposed testing pictures again to generate the corresponding comparison image templates again. Therefore, the feature data compression device can shorten the computing time.

(3) The feature data compression device can compress the data volume of the face feature data by the mirrorability and the transposability of the face feature to avoid reducing the angle of the face detection, lowering the precision of the comparison image template, and affecting the detection performance caused by the reduction of the data volume.

DESCRIPTION OF THE PREFERRED EMBODIMENTS

The technical characteristics and effect of the feature data compression device and the multi-directional face detection system and method applying the feature data compression device in accordance with the present invention will become apparent by the detailed description of preferred embodiments and related drawings as follows. For simplicity, same numerals are used to represent respective elements in the preferred embodiment and drawings.

Figure 1:
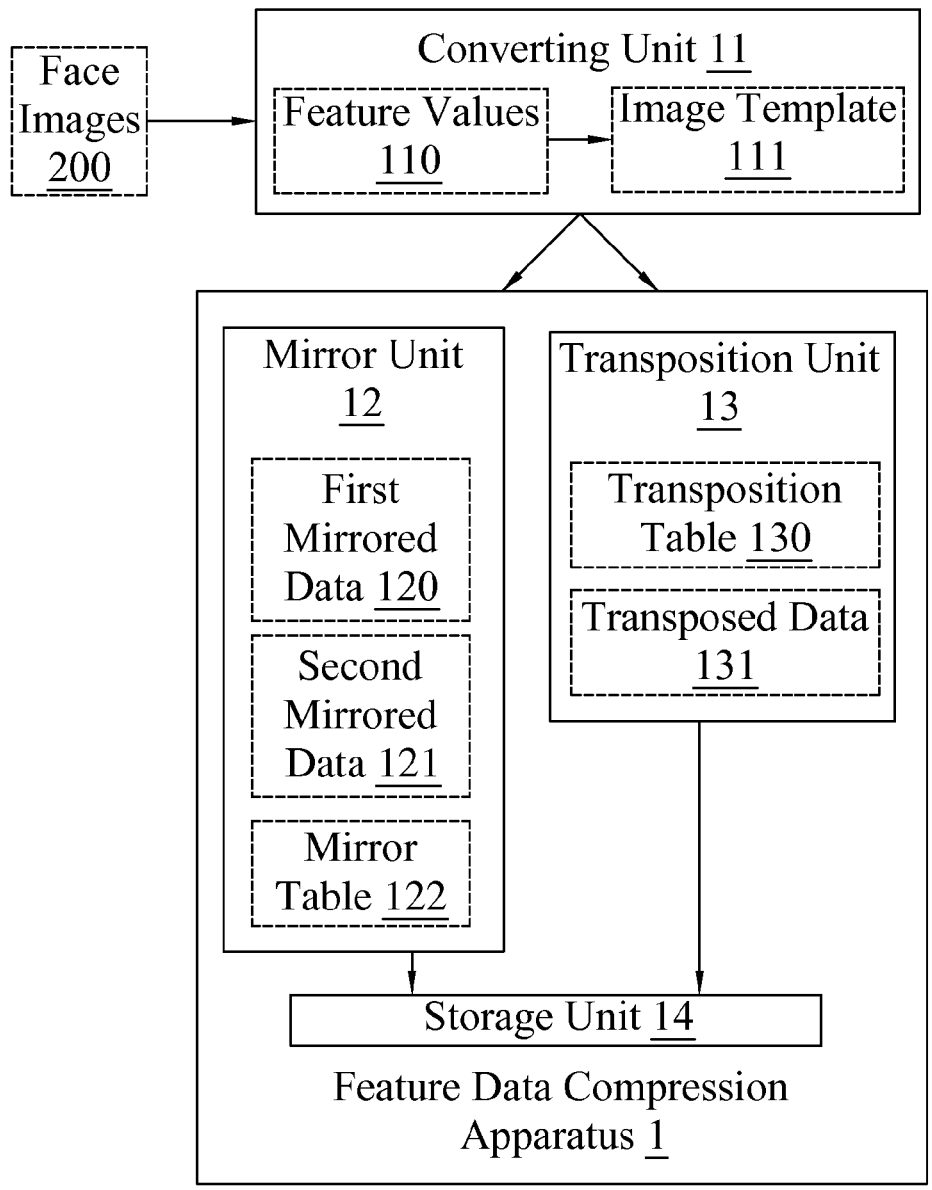
FIG. 1 is a block diagram of a feature data compression device of the present invention.

With reference to FIG. 1 for the block diagram of a feature data compression device of the present invention, the feature data compression device 1 is applicable in a multi-directional face detection system 2, and the feature data compression device 1 comprises a converting unit 11, a mirror unit 12, a transposition unit 13 and a storage unit 14. The converting unit 11 captures a face feature from a face image 200, divides the face image 200 into a plurality of patterns, and converts the patterns obtain a plurality of feature values 110 of the face image. Each feature value 110 set a different weight value according to the texture differences of a face. Namely, each feature value 110 has the feature representation with different strength. The converting unit 11 forms at least one image template 111 according to the feature values 110. Each image template 111 can be a face comparison pattern when the multi-directional face detection system 2 performs a face detection, for example, a comparison pattern of front face or side face.

The mirror unit 12 is coupled to the converting unit 11 for receiving and comparing the feature values 110. If the feature values 110 are symmetric after comparing feature values 110 each other by the mirror unit 12, then the mirror unit 12 records positions of the symmetric feature values 110, abandons one of each two mutual symmetric feature values 110 to form the first mirrored data 120, and reduces the data volume of the feature values 110. Because the feature values 110 are symmetric, therefore the image template 111 according to the feature values 110 can be a front face comparison pattern. Further, the mirror unit 12 can only store the feature values 110 of left-half face or right-half face to from the first mirrored data 120 according to the feature mirrorability of front face, thus reducing the data volume effectively comparing to storing the feature values 110 of whole face.

Or the feature values 110 are not symmetric after comparing the feature values 110 each other by the mirror unit 12, the mirror unit 12 sorts and records a position of each feature value 110 respectively according to the weight of each feature value 110 and obtain a position of the feature values 110 with the highest weight to form the second mirrored data 121. Because the feature values 110 are symmetric, therefore, the image template 111 formed according to the feature values 110 can be a comparison pattern of left-side face or right-side face. Further, the mirror unit 12 can only store the feature values 110 of left-side face or right-side face to from the second mirrored data 121 according to the feature mirrorability of left-side face and right-side face, thus reducing the data volume effectively. Meanwhile, the mirror unit 12 has a mirror table 122, and forms the first mirrored data 120 or the second mirrored data 121 according the mirror table 122.

The transposition unit 13 is coupled to the converting unit 11 for transposing the at least one image template 111 with an angle according to a transposition table 130, for example, transposing clockwise with 90 degrees, 180 degrees, or 270 degrees, computing the image template 111 with an angle and obtaining a plurality of transposed feature values to form the transposed data 131. Briefly, the feature values 110 have transposability according to the transposition table 130. Therefore the transposition unit 13 obtains the multi-directional transposed data 131 by checking the table further forming a multi-directional transposed comparison pattern to reduce the data volume effectively.

The storage unit 14 is coupled to the converting unit 11, the mirror unit 12, and the transposition unit 13 to store a plurality of feature values 110 of the face image, the first mirrored data 120, the second mirror data 121, and the transposed data 131 described above.

In this preferred embodiment, when the multi-directional face detection system 2 receives the testing face images 200, the feature data compression device checks the table according to the first mirrored data 12, the second mirrored data 121 or the transposed data 131 in the storage unit 14. The system computes the first mirrored data 120 to obtain a front face comparison pattern, computes the second mirrored data 121 to obtain a side face comparison pattern or computes the transposed data 131 to obtain a multi-directional transposed face comparison pattern. Thus, the present invention of the multi-directional face detection system 2 can only store a sampling image template, and the feature data compression device 1 checks the table to obtain the mirrored feature value data or the transposed feature value data. Therefore, it is avoided that storing multi kinds of face comparison patterns, for example, a comparison pattern of front face, left-side face, right-side face, front face transposed to 90 degrees or front face transposed to 270 degrees, makes the system store a large amount of data volume and consume the memories.

Figure 2:
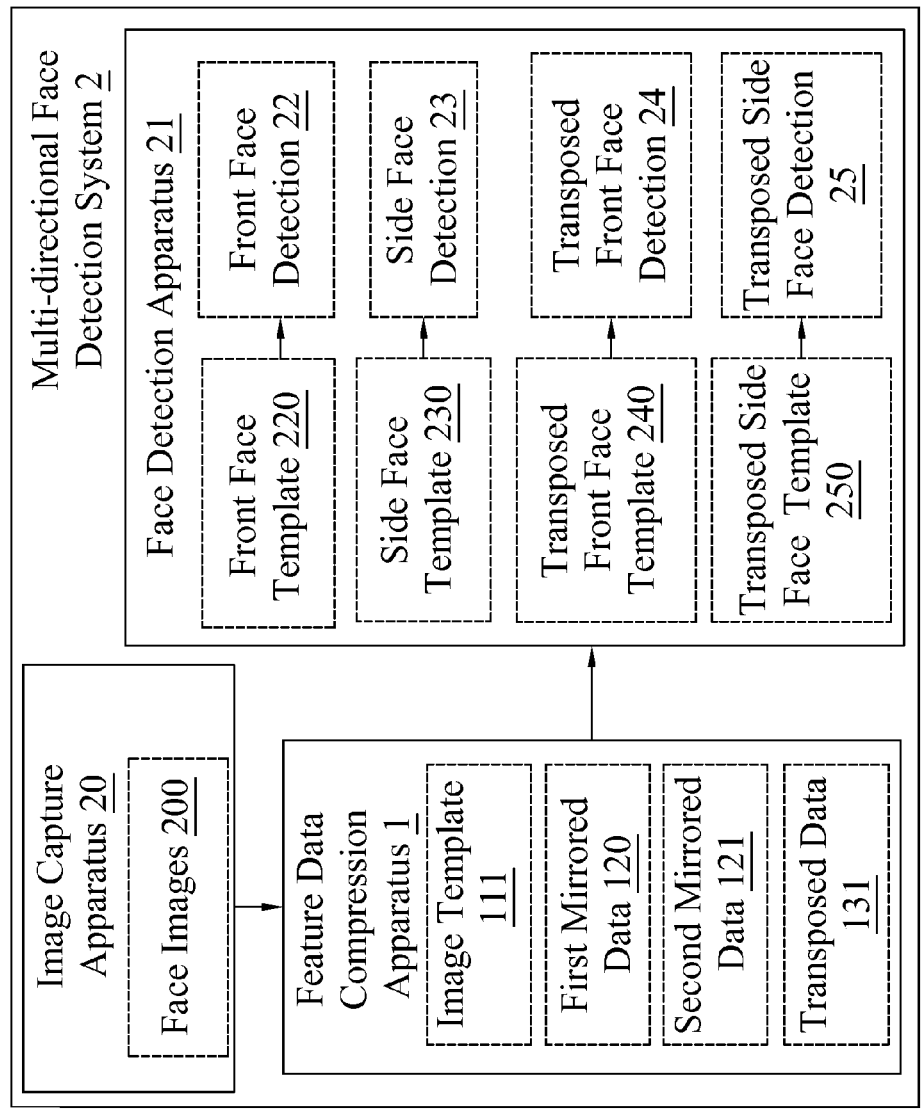
FIG. 2 is a block diagram of a multi-directional face detection system of the present invention.

With reference to FIG. 2 for the block diagram of a multi-directional face detection system of the present invention, the multi-directional face detection system 2 uses the mirrorability and the transposability of face feature compressing the feature data volume by the aforementioned feature data compression device 1. Meanwhile, the system obtains the mirrored feature value data or the transposed feature value data by the feature data compression device 1 performing checking the table to obtain multi-directional face comparison patterns and detects the face in the testing images. The multi-directional face detection system 2 further comprises an image capture device 20 and a face detection device 21. The image capture device 20 can be an image capture device such as a camera, a mobile phone camera, a camcorder or a monitor coupled to the converting unit 10 and the feature data compression device 1 for capturing a plurality of testing images.

The converting unit 11 is coupled to the image capture device 20 for capturing a face feature from one of the testing images including a face of a face image 200. The converting unit 11 divides the face image 200 into a plurality of patterns, and the patterns are converted to obtain a plurality of feature values 110 of the face image. Because the face texture has different directions and feature visibility, each feature value 110 set a different weight value. The converting unit 11 forms at least one image template 111 according to the feature values 110. Each image template 111 is the face comparison pattern when the multi-directional detection system 2 performs a face detection, for example, a front face comparison pattern or a side face comparison pattern.

The face detection device 21 is coupled to the feature data compression device 1 for reading a plurality of feature values 110 of the image template 111 according to the detection, or the feature data compression device 1 checks the table according to the first mirrored data 120, the second mirrored data 121 or the transposed data 131 in the storage unit 14 to perform a front face detection 22, a side face detection 23 or a transposed front face detection 24. Thus, the face detection device 21 compares and detects various face patterns of the testing images according to the feature values 110, the first mirrored data 120, the second mirrored data 121 or the transposed data 131.

Namely, when a front face in the testing images, the face detection device 21 can form the front face template 220 by the at least one image template 111 described above, or the feature data compression device 1 checks the first mirrored data 120 to from the front face template 220. When a side face in the testing images, the face detection device 21 forms the side face template 230 by the at least one image template 111 described above, or the feature data compression device 1 checks the second mirrored data 121 to from the side face template 230. The face detection device 21 performs a side face detection 23 of side face according to the side face template 230. When a transposed front face or transposed side face in the testing images, the feature data compression device 1 checks the transposed data 31 to form a transposed front face template 240 or a transposed side face template 250. Then, the face detection device 21 performs a transposed front face detection 24 of the transposed front face according to the transposed front face template 240, or the face detection device 21 performs a transposed side face detection 25 of the transposed side face according to the transposed side face template 250.

In this preferred embodiment, the first mirrored data 120 can be the feature data of the left-half or right-half of front face, and the second mirrored data 121 can be the feature data of left-side face or right-side face. The transposed data 131 can be the front face feature data transposed with 90 degrees, 180 degrees or 270 degrees. Thus, the front face template 220 recovers to a front face comparison template by computing the feature data of left-half face or right-half face. The side face template 230 forms a comparison template of right-side face symmetrically via computing the feature data of left-side face or forms a comparison template of left-side face symmetrically via computing the feature data of right-side face. The transposed front face template 240 has types of the template of 90 degrees, 180 degrees or 270 degrees according to the different directions of the transposed feature data.

Therefore, the multi-directional face detection system 2 can store only a sampling template, and the feature data compression device 1 checks the table to obtain the mirrored feature value data or the transposed feature value data, thus it is avoided that storing multi kinds of face comparison patterns, for example, a front face, a left-side face, a right-side face, a front face transposed with 90 degrees or a front face transposed to 270 degrees, makes the system store a large amount of data volume and consume the memories.

Figure 3:
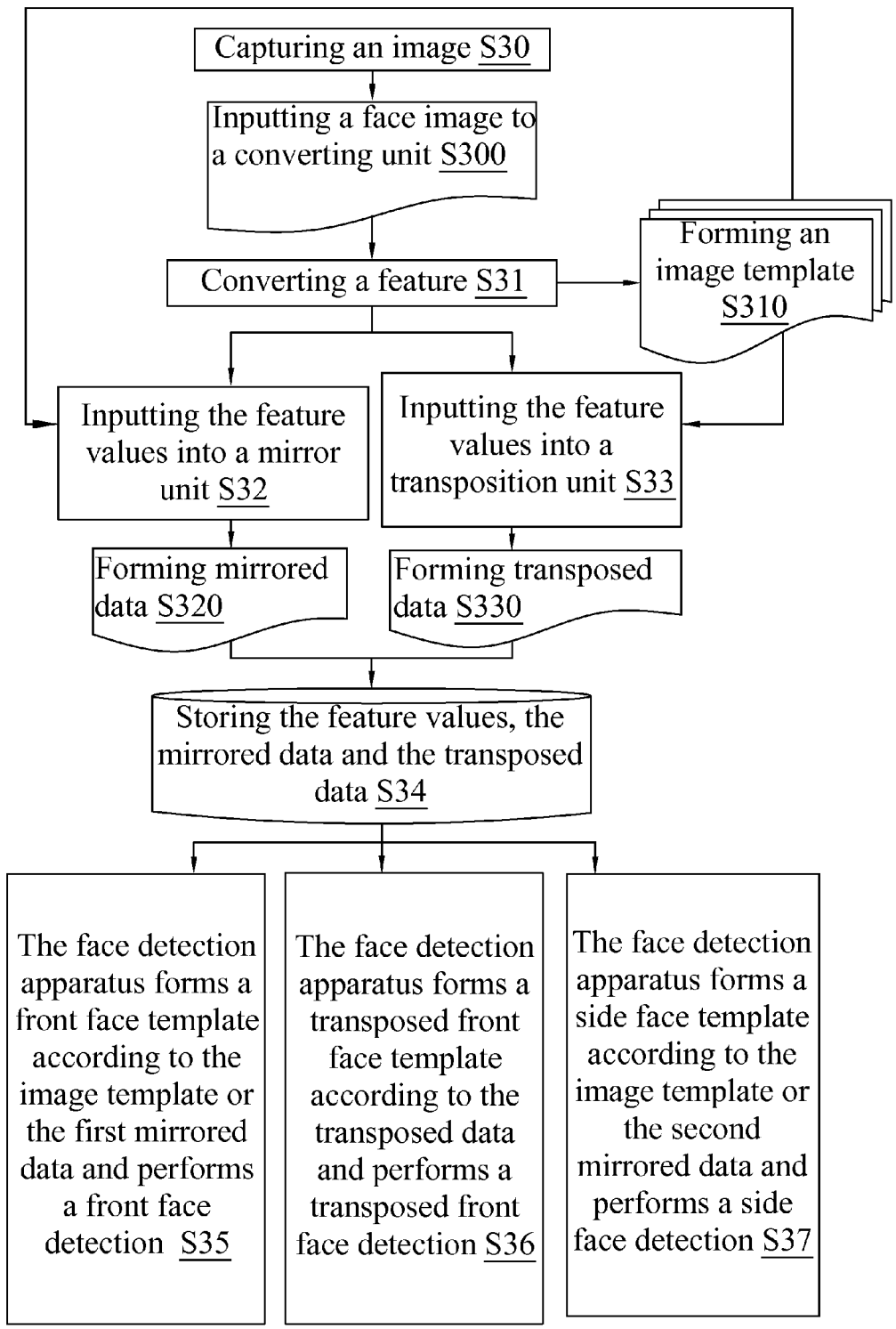
FIG. 3 is a flow chart of a multi-directional face detection system of the present invention.

With reference to FIG. 3 for a flow chart of a multi-directional face detection method in accordance with the present invention, the multi-directional face detection method is a face detection method of a multi-directional face detection system. The multi-directional face detection system comprises an image capture device, a feature data compression device and a face detection device. The feature data compression device further comprises a converting unit, a mirror unit and a transposition unit. The face detection method comprises the following steps:

In Step S30, the image capture device captures a plurality of images, which are the testing images. Step S300 is carried out, wherein an image frame containing a face in one of the testing images is used for capturing a face feature of face image, and the image capture device inputs the face image into a converting unit.

In Step S31, the face image is divided into a plurality of patterns after the converting unit receives the face image, and the patterns are converted to obtain a plurality of feature values of the face image. Each feature value set a different weight value according to the texture differences of a face. Namely, each feature value has the feature representation with different strength. Thus, Step S310 is carried out, wherein the weight value of each feature value is recorded and the feature values are formed at least one image template.

In Step S32, the mirror unit receives the feature data and compares the feature values with each other. Entering into Step S320, if the feature values are symmetric, then the mirror unit will record positions of the symmetric feature values and abandon one of each two mutual symmetric feature values to form the first mirrored data. If the feature values are not symmetric after the mirror unit compares the feature values with each other. The mirror unit sorts and records a position of each feature value respectively according to the weights of each feature value to obtain a position of the feature values with the highest weight value to form the second mirrored data.

Meanwhile, in Step S33, the transposition unit receives the feature values and transposes the at least one image template described above with an angle according to a transposition table. Step S330 is carried out, wherein each image template with an angle is computed to obtain a plurality of transposed feature values, and the transposed feature values are recorded to form the transposed data.

In Step S34, the feature values, image template, the first mirrored data, the second mirrored data and the transposed data are stored in the storage unit.

In Step S35, the face detection device performs a front face detection according to a front face pattern, wherein the front face template is recovered by the image template or computed and formed by the first mirrored data.

In Step S36, the face detection device performs a transposed front face detection according to a transposed front face template, wherein the transposed front face template is formed by the transposed feature data.

In Step S37, the face detection device performs a side face detection according to a side face pattern, wherein the side face template is recovered by the image template or computed and formed by the second mirrored data.

The detailed description and implementation of the multi-directional face detection method of the present invention have been described in the description of the multi-directional face detection system of the invention already, and thus they will not be described here again.

Figure 4:
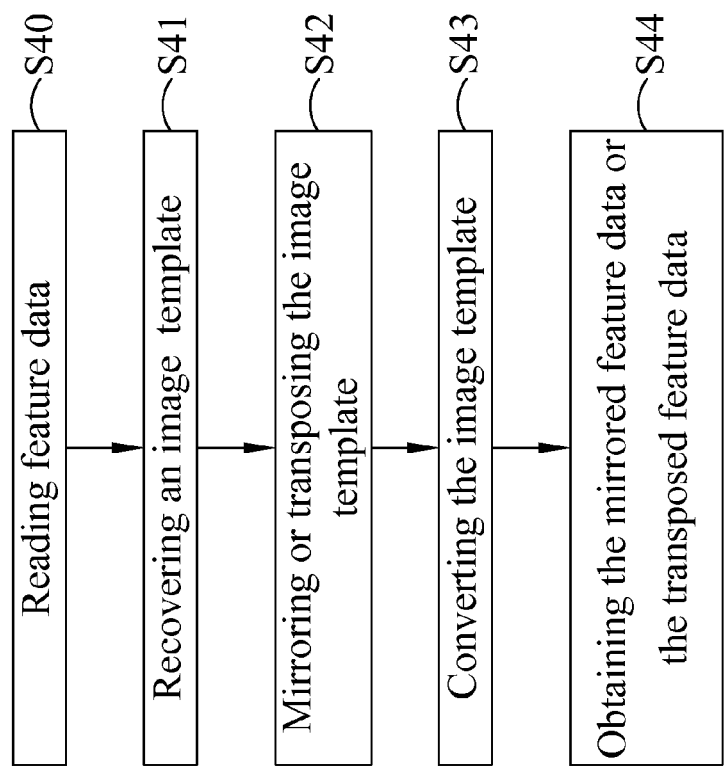
FIG. 4 is a flow chart of forming a template in a multi-directional face detection method of the present invention.

With reference to FIG. 4 for a flow chart of forming a template by a multi-directional face detection method in accordance with the present invention, the face detection device uses the original feature values, the mirrored feature data or the transposed feature data to form a front face template, a side face template, a transposed front face template or a transposed side face template. The template is used for performing a face detection by the face detection device. The procedure of forming the comparison template comprises the following steps:

In Step S40, the face detection device reads feature values computed by feature data compression device after the multi-directional face detection system captures a plurality of testing images by a capture device.

In Step S41, according to the feature values, the face detection device recovers at least one image template by the feature data compression device.

In Step S42, via the feature data compression device checking the table, the mirror unit simplifies the feature data describe above to simplify the original front face to the left-half face or right-half face image template, or the original left-side face image template forms symmetrically to the right-side face image template, and the right-side face image template forms symmetrically to the left-side face image template. Meanwhile, the feature values described above transposes the original front face image template with 90 degrees, 180 degrees or 270 degrees by the transposition unit to form the transposed front face image template.

In Step S43, the converting unit converts the image template of left-half face, right-half face, left-side face, right-side face or transposed front face. Then, in Step S44, the mirrored feature values are the mirrored data and the transposed feature values are the transposed data.

Figure 5:
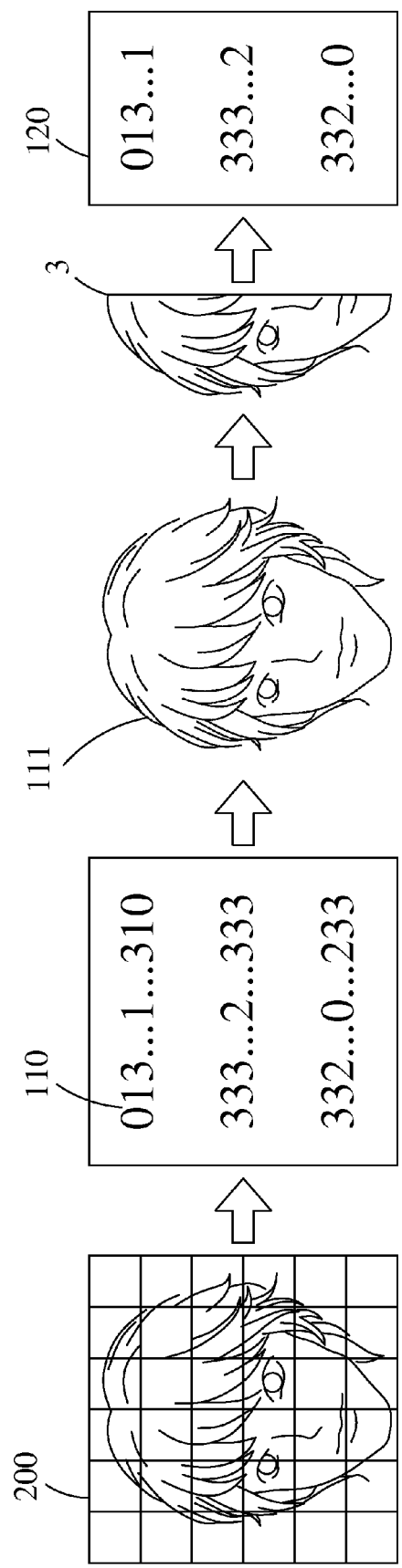
FIG. 5 is a schematic view of forming the first mirrored data in a multi-directional face detection method of the present invention.

With reference to FIG. 5 for a schematic view of forming the first mirrored data of the multi-directional face detection method in accordance with the present invention, after the image capture device 20 captures a plurality of testing images, the converting unit 11 divides a face image 200 including a front face in the testing image into a plurality of patterns and converts the feature according to the patterns to obtain a plurality feature values 110 of front face to form at least one image template 111. Then, the mirror unit 12 compares the feature values 110 one by one. If the feature values 110 are symmetric, then the image templates 111 are the comparison patterns of front face. Thus, according to the mirrorablity of the feature values 110, the mirror unit 12 will abandon one of each two mutual symmetric feature values 110 and keep any one of the half face features to form a half-face image template 3. For example, the left-half or the right-half of front face is kept to reduce the data volume of the feature data.

The mirror unit 12 records the positions of symmetric feature values 110, and the converting unit 11 converts the simplified half-face image template 3 by the converting unit 11 to obtain the mirrored feature values, the first mirrored data 120.

When the multi-directional face detection system 2 performs a face detection, the face detection device 21 recovers the first mirrored data 120 back to the front face template 220 to perform a front face detection 22.

Figure 6:
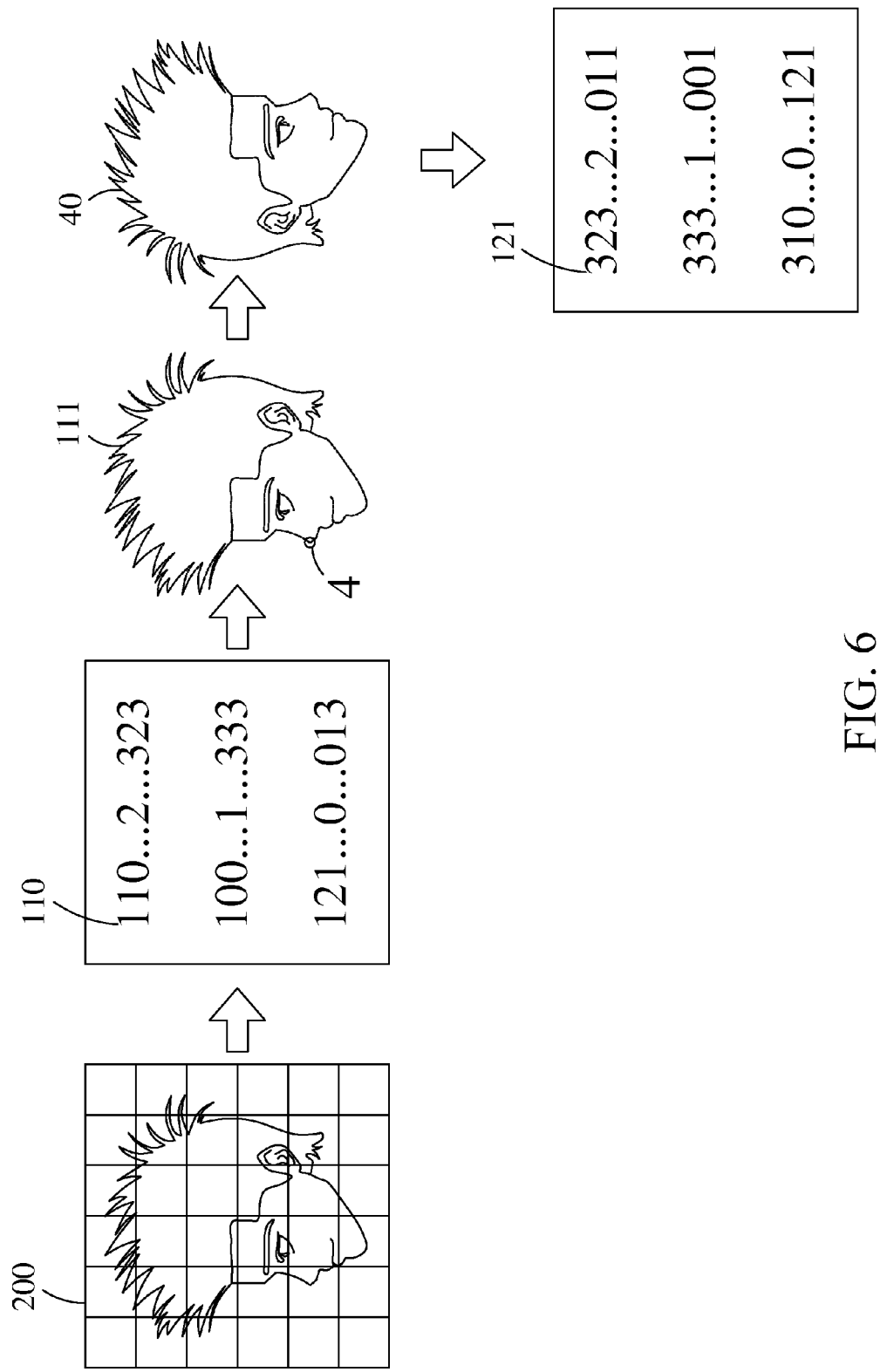
FIG. 6 is a schematic view of forming the second mirrored data in a multi-directional face detection method of the present invention.

With reference to FIG. 6 for a schematic view of forming the second mirrored data of a multi-directional face detection method in accordance with the present invention, after the image capture device 20 captures a plurality of testing images, the converting unit 11 divides the face image 200 including front face in the testing image into a plurality of patterns and converts the feature according to the patterns to obtain a plurality of feature values 110 of the front face to form at least one image template 111. Then, the mirror unit 12 compares the feature values 110 one by one. If the feature values 110 are not symmetric, then the image templates 111 are the side faces image templates, comparison patterns of side face.

In this preferred embodiment, the at least one side face image template can be a comparison pattern of left-side face. After comparing by the mirror unit 12, the feature value representing nose 4 with the highest weight value. Thus, the mirror unit 12 records the positions of the feature values 110 of left-side comparison pattern. Via checking the table, the mirror unit 12 performs morroring and the nose 4, the feature value 110 with the highest weight value, is the mirrored center to obtain a comparison pattern of right-side face, a symmetric side face image template 40. The positions of the feature values 110 of the at least one right-side face comparison image template are recorded, and the symmetric side face image template 40 is converted by the converting unit 11 to obtain the mirrored feature values, the second mirrored data 121.

When the multi-directional face detection system 2 performs a face detection, the face detection device 21 forms symmetrically the side face template 230 to perform a side face detection 23.

Figure 7:
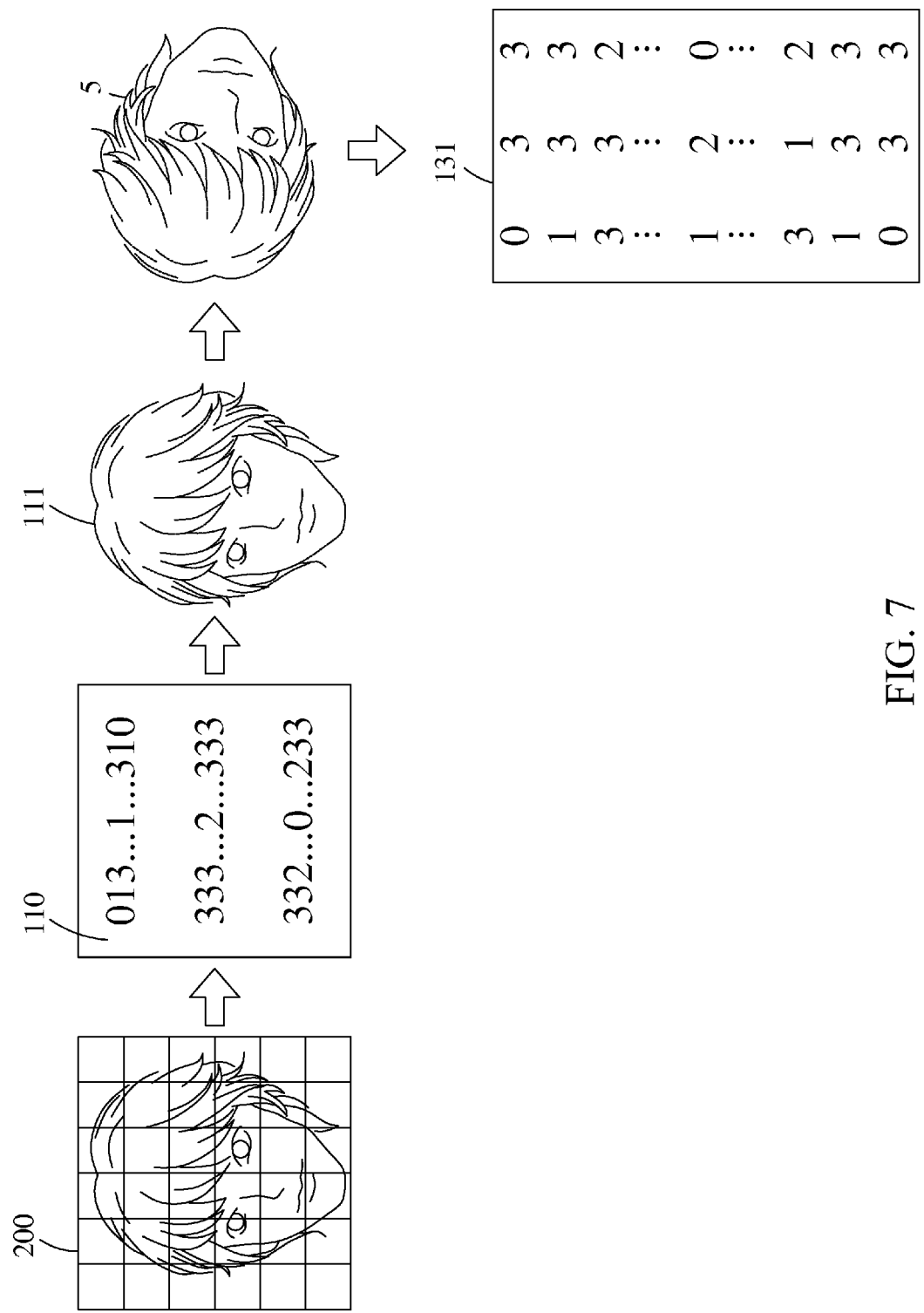
FIG. 7 is a schematic view of forming transposed data in a multi-directional face detection method of the present invention.

With reference to FIG. 7 for a schematic view of forming transposed data by a multi-directional face detection method in accordance with the present invention, after the image capture device 20 captures a plurality of testing images, the converting unit 11 divides the face image 200 including front face in the testing images into a plurality of patterns and converts the features according to the patterns to obtain a plurality of feature values 110 of front face to form at least one image template 111. The transposition unit 13 transposes the at least one image template 111 with an angle according to a transposition table 130, for example, transposing clockwise with 90 degrees, 180 degrees, or 270 degrees, to form a transposed image template 5, a front face comparison pattern with transposed angle. The converting unit 11 converts the transposed image template 5 to obtain a plurality of transposed feature values to record and form transposed data 131.

When the multi-directional face detection system 2 performs a face detection, the face detection device 21 forms transposed front face template 240 according to the transposed data 131 to perform a transposed front face detection 24. Briefly, the transposition unit 13 obtains multi-directional transposed data 131 via checking the table, further forming a multi-directional transposed face comparison pattern. Therefore, the multi-directional face detection system 2 does not capture the face feature with different directions again. Namely, the front face comparison pattern with different directions can store just one direction. Thus, the multi-directional face detection system 2 transposes the same front face comparison pattern to obtain a multi-directional transposed front face template 240 to reduce the data volume effectively.

In summation of the description above, the feature data compression device, and the multi-directional face detection system and method applying the feature data compression device can reduce the original feature data by means of the mirrorability of the face feature to reduce the data volume of the feature data and the consumption of the memory space. In addition, the invention also can overcome the problem of requiring sampling the features of the transposed testing pictures to generate the corresponding comparison image templates again by means of the transposability of the original feature data and the transposition of the data to a required angle, so as to reduce the quantity of the stored image template and shorten the computing time.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A feature data compression device, comprising:
    a converting unit converting a face image to obtain a plurality of feature values of the face image, and forming at least one image template according to the plurality of feature values, and each of the feature values including a weight value;
    a mirror unit coupled to the converting unit, and comparing and computing the feature values each other to obtain a position of each mutual symmetric feature values and abandoning one of each two mutual symmetric feature values to form first mirrored data, or comparing and computing the feature values each other to obtain a position of the feature value with a highest weight value to form second mirrored data; and
    a transposition unit coupled to the converting unit, and transposing the at least one image template with an angle according to a transposition table, and computing the transposed image template to obtain a plurality of transposed feature values for forming a transposed data.

2. The feature data compression device of claim 1, wherein the first mirrored data is used to form a front face template.

3. The feature data compression device of claim 1, wherein the second mirrored data is used to form a side face template.

4. The feature data compression device of claim 1, wherein the transposed data is used to form a transposed front face template or a transposed side face template.

5. A multi-directional face detection system using a feature data compression device, comprising:
    an image capture device, capturing a face image;
    a feature data compression device as recited in claim 1 coupled to the image capture device; and
    a face detection device coupled to the image capture device and the feature data compression device, and performing a front face detection, a side face detection, a transposed front face detection or a transposed side face detection according to the first mirrored data, the second mirrored data or the transposed data.

6. The multi-directional face detection system of claim 5, wherein a front face template is formed according to the first mirrored data, and the face detection device performs the front face detection according to the front face template.

7. The multi-directional face detection system of claim 5, wherein a side face template is formed according to the second mirrored data, and the face detection device performs the side face detection according to the side face template.

8. The multi-directional face detection system of claim 5, wherein a transposed front face template or a transposed side face template is formed according to the transposed data, and the face detection device performs the transposed front face detection or the transposed side face detection according to the transposed front face template or the transposed side face template.

9. A detection method, applicable in a multi-directional face detection system, and the multi-directional face detection system comprising an image capture device, a feature data compression device and a face detection device, and the feature data compression device comprising a converting unit, a mirror unit and a transposition unit, and the detection method comprising steps of:

capturing a face image by the image capture device;

computing the face image by the converting unit to obtain a plurality of feature values of the face image;

forming at least one image template according to the feature values, and each of the feature value including a weight value;

comparing and computing the feature values each other by the mirror unit to obtain a position of each mutual symmetric feature value, and abandoning one of each two mutual symmetric feature values to form first mirrored data, or comparing and computing the feature values each other by the mirror unit to obtain a position of the feature value with a highest weight value to form second mirrored data;

transposing the at least one image template with an angle according to a transposition table by the transposition unit, and obtaining a plurality of transposed feature values by computing the transposed at least one image template to form transposed data; and performing a front face detection, a side face detection, a transposed front face detection or a transposed side face detection by the face detection device according to the first mirrored data, the second mirrored data or the transposed data.

10. The detection method of claim 9, further comprising steps of:

forming a front face template by the first mirrored data; and performing the front face detection by the face detection device according to the front face template.

11. The detection method of claim 9, further comprising steps of:

forming a side face template by the second mirrored data; and performing the side face detection by the face detection device according to the side face template.

12. The detection method of claim 9, further comprising steps of:

forming a transposed front face template or a transposed side face template according to the transposed data; and performing the transposed front face detection or the transposed side face detection by the face detection device according to the transposed front face template or the transposed side face template.

* * * * *